United States Patent
Lin

(10) Patent No.: US 11,514,776 B1
(45) Date of Patent: Nov. 29, 2022

(54) CEILING FAN CONTROL SYSTEM

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 0 days.

(21) Appl. No.: 17/399,949

(22) Filed: Aug. 11, 2021

(51) Int. Cl.
  *G08C 17/02* (2006.01)
  *F04D 25/06* (2006.01)
  *F04D 27/00* (2006.01)
  *G05B 15/02* (2006.01)
  *H05B 47/19* (2020.01)

(52) U.S. Cl.
  CPC ............ *G08C 17/02* (2013.01); *F04D 25/06* (2013.01); *F04D 27/00* (2013.01); *G05B 15/02* (2013.01); *H05B 47/19* (2020.01)

(58) Field of Classification Search
  None
  See application file for complete search history.

(56) References Cited

U.S. PATENT DOCUMENTS

| | | | |
|---|---|---|---|
| 10,954,948 B1 * | 3/2021 | Lowe | F04D 25/0606 |
| 11,029,019 B1 * | 6/2021 | Bucher | F21V 23/0435 |
| 2015/0008846 A1 | 1/2015 | Chen et al. | |

FOREIGN PATENT DOCUMENTS

TW 201616919 A 5/2016

OTHER PUBLICATIONS

A Search Report appended to an Office Action, which was issued to Taiwanese counterpart application No. 109103582 by the TIPO dated May 22, 2020, with an English translation thereof.

* cited by examiner

*Primary Examiner* — Anh Q Tran
(74) *Attorney, Agent, or Firm* — Lewis Roca Rothgerber Christie LLP

(57) ABSTRACT

A system for controlling operation of a ceiling fan is provided. The ceiling fan includes a fan device and a light device, and can be operated via a user operation module that is to be operated by direct operation, or a wireless receiver module that receives a wireless control signal. Within a predetermined control duration from the time of activation, the ceiling fan can, upon receipt of an operation signal from the user operation module or a wireless control signal from the wireless receiver module, switch to operate in a mode where the ceiling fan is controlled via one of the user operation module and the wireless receiver module that corresponds to the signal received thereby.

4 Claims, 1 Drawing Sheet

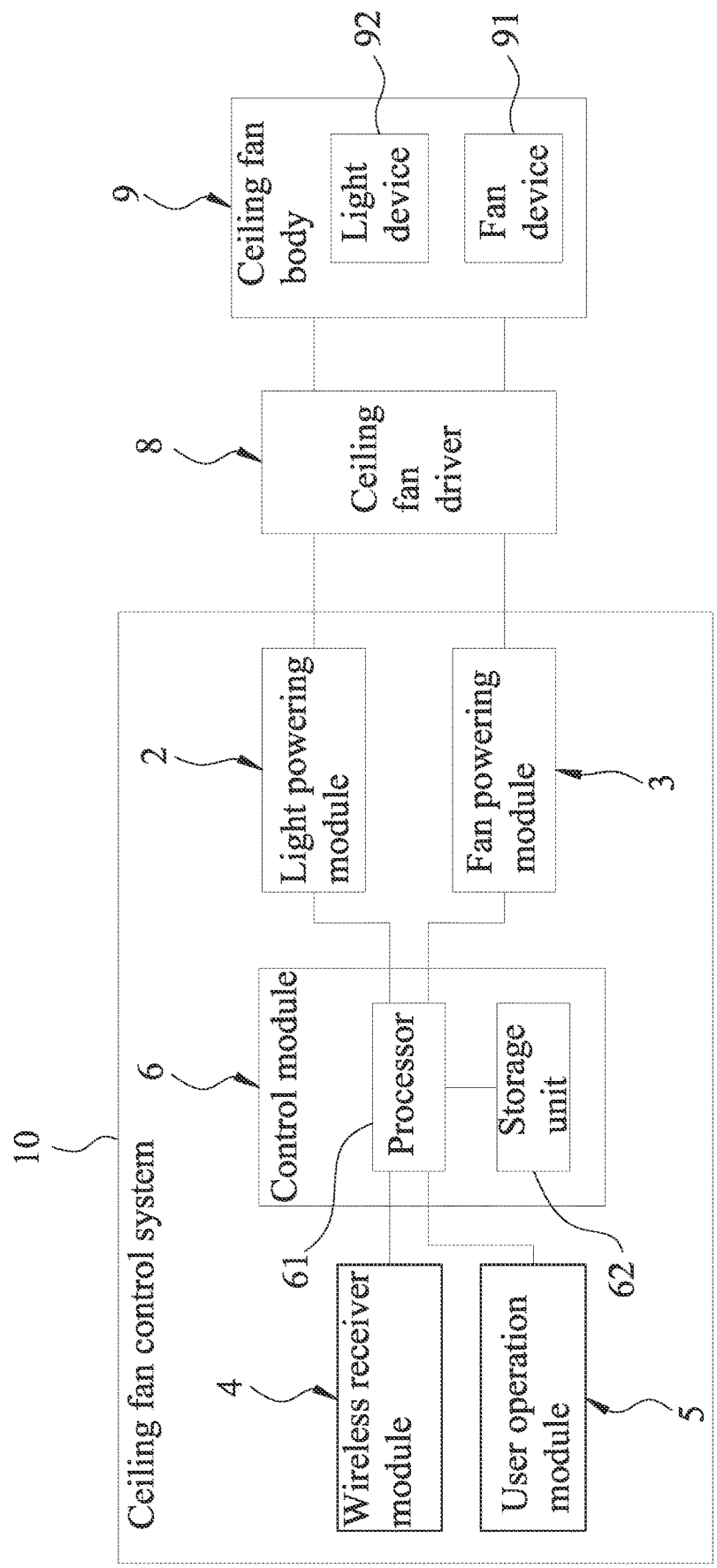

CEILING FAN CONTROL SYSTEM

FIELD

The disclosure relates to a ceiling fan, and more particularly to a ceiling fan control system.

BACKGROUND

A conventional ceiling fan control system is used to control the functions of a ceiling fan, and includes a driving module that drives the ceiling fan, a wall-mount control module that is directly electrically connected to the driving module by wires, and a remote control module that is electrically connected to the driving module by wireless means for remote control. Users may control the ceiling fan by manually operating the wall-mount control module, or by operating the remote control module.

However, the conventional ceiling fan control system is configured to enable use of only one of the wall-mount control module and the remote control module to control the ceiling fan after being activated. If the conventional ceiling fan control system is set to enable the wall-mount control module when being activated, the remote control module cannot be used to control the ceiling fan. If the conventional ceiling fan control system is set to enable the remote control module when being activated, the wall-mount control module cannot be used to control the ceiling fan. If a user wishes to change the enabled one of the wall-mount control module and the remote control module, he or she must specially make a manual change on the operation setting before the conventional ceiling fan control system is turned on, which is inconvenient.

SUMMARY

Therefore, an object of the disclosure is to provide a system for controlling operation of a ceiling fan that includes a light device, a fan device, and a ceiling fan driver electrically connected to the light device and the fan device. The system can alleviate at least one of the drawbacks of the prior art.

According to the disclosure, the system includes a light powering module, a fan powering module, a wireless receiver module, a user operation module and a control module. The light powering module is electrically connected to the ceiling fan driver, and is configured to provide a light driving signal for the ceiling fan driver to drive operation of the light device. The fan powering module is electrically connected to the ceiling fan driver, and is configured to provide a fan driving signal that is an alternating current (AC) power signal and that has a main waveform for the ceiling fan driver to drive operation of the fan device, and to, in response to user operation related to control of one of the light device and the fan device, modulate, for a predetermined length of time, the main waveform of the fan driving signal to obtain a modulated waveform indicating the user operation, so as to make the ceiling fan driver adjust operation of said one of the fan device and the light device according to the user operation. The fan driving signal returns to having the main waveform after the predetermined length of time. The wireless receiver module is configured to receive a wireless control signal for controlling operation of the ceiling fan. The user operation module is operable by direct operation by a user to generate an operation signal for controlling operation of the ceiling fan. The control module includes a processor electrically connected to the light powering module, the fan powering module, the wireless receiver module and the user operation module, and a storage unit electrically connected to the processor and storing a signal database. The processor is switchable to operate in one of a first control mode and a second control mode, receives the wireless control signal from the wireless receiver module through a first signal path, and receives the operation signal from the user operation module through a second signal path that is different from the first signal path. In the first control mode, the processor compares the wireless control signal with the signal database to obtain a first comparison result that indicates user-desired settings conveyed by the user operation, controls the light powering module to output the light driving signal that corresponds to the first comparison result, and controls the fan powering module to output the fan driving signal with the modulated waveform that corresponds to the first comparison result for the predetermined length of time. In the second control mode, the processor compares the operation signal with the signal database to obtain a second comparison result that indicates user-desired settings conveyed by the user operation, controls the light powering module to output the light driving signal that corresponds to the second comparison result, and controls the fan powering module to output the fan driving signal with the modulated waveform that corresponds to the second comparison result for the predetermined length of time. The processor is configured to, when operating in the first control mode, switch to operating in the second control mode upon receipt of the operation signal within a predetermined control duration from the time of activation of the processor. The processor is configured to, when operating in the second control mode, switch to operating in the first control mode upon receipt of the wireless control signal within the predetermined control duration from the time of activation.

BRIEF DESCRIPTION OF THE DRAWING

Other features and advantages of the disclosure will become apparent in the following detailed description of the embodiment(s) with reference to the accompanying drawing, of which:

FIG. 1 is a block diagram illustrating an embodiment of a system for controlling operation of a ceiling fan.

DETAILED DESCRIPTION

Before the disclosure is described in greater detail, it should be noted that where considered appropriate, reference numerals or terminal portions of reference numerals have been repeated among the FIGURES to indicate corresponding or analogous elements, which may optionally have similar characteristics.

FIG. 1 exemplarily shows a ceiling fan that includes a ceiling fan driver 8, a ceiling fan body 9, and an embodiment of a system 10 for controlling operation of the ceiling fan driver 8. The ceiling fan body 9 includes a fan device 91 and a light device 92 that are electrically connected to the ceiling fan driver 8. The ceiling fan driver 8 is operable by the system 10 to drive operations of the fan device 91 and the light device 92.

The system 10 includes a light powering module 2, a fan powering module 3, a wireless receiver module 4, a user operation module 5 and a control module 6.

The light powering module 2 is electrically connected to the ceiling fan driver 8, and is configured to output a light driving signal to the ceiling fan driver 8. In this embodiment, the light driving signal serves as electric power that is used by the ceiling fan driver 8 to drive light emission of the light device 92. As an example, the light powering module 2 may include a voltage transformer, a voltage converter, etc. but this disclosure is not limited in this respect.

The fan powering module 3 is electrically connected to the ceiling fan driver 8, and is configured to output, to the ceiling fan driver 8, a fan driving signal that is an alternating current (AC) power signal, that has a main waveform, and that serves as AC electric power to be used by the ceiling fan driver 8 to drive operation of the fan device 91. As an example, the fan powering module 3 may include a voltage transformer, a voltage converter, etc. but this disclosure is not limited in this respect. In response to user operation on the wireless receiver module 4 or the user operation module 5, wherein the user operation is related to control of the fan device 91 and/or the light device 92, the fan powering module 3 modulates, for a predetermined length of time, the main waveform of the fan driving signal to obtain a modulated waveform for the fan driving signal wherein the modulated waveform indicates what is intended by the user operation. After the predetermined length of time, the fan powering module 3 stops the modulation, and the fan driving signal returns to having the main waveform. The modulation of the main waveform to obtain the modulated waveform may be performed in various manners, such as blocking a part of the main waveform, changing a frequency of the main waveform, etc. The predetermined length of time may range, for example, from two seconds to three seconds, but this disclosure is not limited in this respect, and the predetermined length of time may be set as desired by manufacturers. Upon receipt of the fan driving signal, the ceiling fan driver 8 determines user-desired settings conveyed by the user operation (e.g., a user-desired rotational speed for the fan device 91, and user-desired brightness, color temperature, and light emitting fashion of light emitted by the light device 92) based on the modulated waveform, determines whether the modulated waveform continues for the predetermined length of time, and drives operations of the fan device 91 and the light device 92 in a user-desired fashion as defined by the user operation (e.g., driving the fan device 91 to have the user-desired rotational speed, and driving the light device 92 to emit light with the user-desired brightness, the user-desired color temperature, and the user-desired light emitting fashion, such as continuous lighting, flashing, etc.) by modulating the light driving signal and the fan driving signal according to the user-desired settings thus determined, and providing the modulated light driving signal and the modulated fan driving signal to the light device 92 and the fan device 91, respectively.

The wireless receiver module 4 receives a wireless control signal, which may be a radio frequency (RF) signal emitted by, for example but not limited to, a remote controller (not shown). The wireless control signal indicates user operation that is performed on the remote controller.

The user operation module 5 is operable by direct operation (e.g., a touch operation, a pressing operation, etc.) by a user to generate an operation signal that indicates user operation performed on the user operation module 5. In this embodiment, the user operation module 5 is a wall-mount controller that is fixed to a wall. In some embodiments, the user operation module 5 includes multiple buttons (not shown) for operation by the user. In some embodiments, the user operation module 5 may be a touch screen.

The control module 6 includes a processor 61 and a storage unit 62. The processor 61 is electrically connected to the light powering module 2, the fan powering module 3, the wireless receiver module 4 and the user operation module 5. The storage unit 62 is electrically connected to the processor 61 and stores a signal database and a control mode parameter. In this embodiment, the storage unit 62 may be, for example, a flash memory module, but this disclosure is not limited in this respect. In this embodiment, the processor 61 may be electrically connected to the user operation module 5 by wires, but in some embodiments, the processor 61 may be electrically connected to the user operation module 5 by wireless connection, and this disclosure is not limited in this respect.

The processor 61 is switchable to operate in one of a first control mode and a second control mode, and the control mode parameter that is stored in the storage unit 62 corresponds to one of the first control mode and the second control mode. The signal database has multiple signal datasets for comparison with the wireless control signal and the operation signal, each of which includes one of the signal datasets, and multiple control datasets that respectively correspond to the signal datasets. The processor 61 controls operations of the light powering module 2 and the fan powering module 3 based on one of the control datasets. For example, the signal datasets may respectively correspond to different combinations of settings related to operation of the fan device 91 and the light device 92, such as different combinations of multiple rotational speeds (e.g., high, medium and low rotational speeds) of the fan device 91 and multiple brightness settings (e.g., high brightness and low brightness) of the light device 92, and the control datasets correspond to those combinations and are used by the processor 61 to control operations of the light powering module 2 and the fan powering module 3 in accordance with the corresponding combinations. It is noted that, since this disclosure does not focus on circuit structures of the light powering module 2 and the fan powering module 3, and one skilled in the art should be able to realize the corresponding circuit design based on the descriptions related to the signal transmission in this disclosure, details for the circuit structures are omitted herein for the sake of brevity.

In this embodiment, the processor 61 receives the wireless control signal from the wireless receiver module 4 through a first signal path, and receives the operation signal from the user operation module 5 through a second signal path that is different from the first signal path.

In the first control mode, the processor 61 compares the wireless control signal with the signal datasets of the signal database to determine which signal dataset matches the wireless control signal, and as a result, obtains the same to serve as a first comparison result that indicates the user-desired settings conveyed by the user operation that is performed on the remote controller, controls the light powering module 2 to output the light driving signal that corresponds to the first comparison result (i.e., the signal dataset thus obtained) based on one of the control datasets that corresponds to the first comparison result, and controls the fan powering module 3 to output the fan driving signal with the modulated waveform that corresponds to the first comparison result based on said one of the control datasets for the predetermined length of time.

In the second control mode, the processor 61 compares the operation signal with the signal datasets of the signal database to determine which signal dataset matches the operation signal, and as a result, obtains the same to serve as a second comparison result that indicates the user-desired settings conveyed by the user operation that is performed on the user operation module 5, controls the light powering module 2 to output the light driving signal that corresponds to the second comparison result (i.e., the signal dataset thus obtained) based on one of the control datasets that corresponds to the second comparison result, and controls the fan powering module 3 to output the fan driving signal with the modulated waveform that corresponds to the second comparison result based on said one of the control datasets for the predetermined length of time.

When the control mode parameter corresponds to the first control mode at the time the processor 61 is being activated, the processor 61 operates in the first control mode based on the control mode parameter. When the control mode parameter corresponds to the second control mode at the time the processor 61 is being activated, the processor 61 operates in the second control mode based on the control mode parameter.

Within a predetermined control duration from the time of activation, the processor 61, when operating in the first control mode (e.g., based on the control mode parameter that corresponds to the first mode when being activated), switches to operating in the second control mode upon receipt of the operation signal from the user operation module 5. Within the predetermined control duration from the time of activation, the processor 61, when operating in the second control mode (e.g., based on the control mode parameter that corresponds to the second mode when being activated), switches to operating in the first control mode upon receipt of the wireless control signal from the wireless receiver module 4. In this embodiment, the predetermined control duration may be of, for example, ten seconds, but this disclosure is not limited in this respect, and the length of the predetermined control duration can be set as desired by manufacturers.

After switching from one of the first and second control modes to the other one of the first and second control modes, the processor 61 updates the control mode parameter to make the control mode parameter correspond to said the other one of the first and second control modes.

In other words, the processor 61 operates in one of the first and second control modes to which the control mode parameter corresponds when being activated, and determines whether there is an input of the operation signal or the wireless control signal within the predetermined control duration after activation. If the determination is negative, the processor 61 continues to operate in the original mode. If the determination is affirmative, the processor 61 may switch to operating in one of the first and second control modes to which the signal thus received corresponds (e.g., the operation signal corresponds to the second control mode and the wireless control signal corresponds to the first control mode in this embodiment).

In summary, by virtue of the configuration of the wireless receiver module 4, the user operation module 5 and the processor 61, the processor 61 can automatically operate in the first control mode or the second control mode once the wireless control signal or the operation signal is received within the predetermined control duration counting from the time of activation of the processor 61. As a result, the user is not required to purposefully change the settings of the ceiling fan before the ceiling fan is turned on, and, after being activated, the processor 61 can automatically switch to operating in the first control mode or the second control mode, depending on which one of the wireless receiver module 4 and the user operation module 5 the user uses to operate the ceiling fan. Significant improvement in terms of convenience is thus achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A system for controlling operation of a ceiling fan that includes a light device, a fan device, and a ceiling fan driver electrically connected to the light device and the fan device, said system comprising:

a light powering module that is electrically connected to the ceiling fan driver, and that is configured to provide a light driving signal for the ceiling fan driver to drive operation of the light device;

a fan powering module that is electrically connected to the ceiling fan driver, and that is configured to provide a fan driving signal that is an alternating current (AC) power signal and that has a main waveform for the ceiling fan driver to drive operation of the fan device, and to, in response to user operation related to control of one of the light device and the fan device, modulate, for a predetermined length of time, the main waveform of the fan driving signal to obtain a modulated waveform indicating the user operation, so as to make the ceiling fan driver adjust operation of said one of the fan device and the light device according to the user operation, wherein the fan driving signal returns to having the main waveform after the predetermined length of time;

a wireless receiver module that is configured to receive a wireless control signal for controlling operation of the ceiling fan;

a user operation module that is operable by direct operation by a user to generate an operation signal for controlling operation of the ceiling fan; and a control module that includes a processor electrically connected to said light powering module, said fan powering module, said wireless receiver module and said user operation module, and a storage unit electrically connected to said processor and storing a signal database;

wherein said processor is switchable to operate in one of a first control mode and a second control mode, receives the wireless control signal from said wireless receiver module through a first signal path, and receives the operation signal from said user operation module through a second signal path that is different from the first signal path;

wherein, in the first control mode, said processor compares the wireless control signal with the signal database to obtain a first comparison result that indicates user-desired settings conveyed by the user operation, controls the light powering module to output the light driving signal that corresponds to the first comparison result, and controls the fan powering module to output the fan driving signal with the modulated waveform that corresponds to the first comparison result for the predetermined length of time;

wherein, in the second control mode, said processor compares the operation signal with the signal database to obtain a second comparison result that indicates the user-desired settings conveyed by the user operation, controls the light powering module to output the light driving signal that corresponds to the second comparison result, and controls the fan powering module to output the fan driving signal with the modulated waveform that corresponds to the second comparison result for the predetermined length of time;

wherein said processor is configured to, when operating in the first control mode, switch to operating in the second control mode upon receipt of the operation signal within a predetermined control duration from a time of activation of said processor; and wherein said processor is configured to, when operating in the second control mode, switch to operating in the first control mode upon receipt of the wireless control signal within the predetermined control duration from the time of activation of said processor.

2. The system of claim 1, wherein said storage unit further stores a control mode parameter that corresponds to one of a first control mode and a second control mode;

wherein, when the control mode parameter corresponds to the first control mode at the time said processor is being activated, said processor operates in the first control mode based on the control mode parameter; and wherein, when the control mode parameter corresponds to the second control mode at the time said processor is being activated, said processor operates in the second control mode based on the control mode parameter.

3. The system of claim 2, wherein, after switching from one of the first and second control modes to the other one of the first and second control modes, said processor updates the control mode parameter to make the control mode parameter correspond to the other one of the first and second control modes.

4. The system of claim 3, wherein the signal database has multiple signal datasets for comparison with one of the wireless control signal and the operation signal which includes one of the signal datasets, and multiple control datasets that respectively correspond to the signal datasets; and wherein said processor controls operations of said light powering module and said fan powering module based on one of the control datasets that corresponds to a matched one of the signal datasets obtained from comparison between the signal datasets and said one of the wireless control signal and the operation signal.

* * * * *